INVENTOR.
ANDRE' CALMES

United States Patent Office 2,904,670
Patented Sept. 15, 1959

2,904,670

ILLUMINATING SPECTACLES

André Calmes, Nice, France

Application December 9, 1957, Serial No. 701,510

Claims priority, application France April 12, 1957

5 Claims. (Cl. 240—2)

The present invention has reference generally to illuminating spectacles of the type comprising small electric lamps fed by an independent source of current such as a battery which may be carried in a pocket of the user's garment and accommodated in recesses formed in the frame of the spectacles, thereby permitting the user to have a clear view of objects situated at a small distance from his eyes, for example a clear view of a printed sheet which he wishes to read or of a plain sheet on which he wishes to write or to do a similar work without having to resort to normal illumination and without disturbing neighboring persons while doing such work.

An object of the invention is to improve this kind of spectacles in several respects particularly with regard to the arrangement of the lamp-receiving recesses, the leads feeding the lamps with electric current and also in connection with proper definition of the light beams emitted by said lamps so as to ensure a more accurate direction and a better focussed field while at the same time concealing the said leads and the lamp terminals.

Another object of the invention is to provide illuminating spectacles of the aforesaid type wherein the recess formed in the frame for receiving the lamp is open both forwardly and rearwardly, the rearward opening of said recess having a sufficient size for permitting the lamp to be introduced and fixed in proper position (preferably by means of small screws) to terminals connected in turn to the source of electricity, while the forward opening of said recess has a size smaller than that of the lamp for preventing any undue escape of the lamp therethrough after it has been introduced into said recess, said rearward opening of the lamp-receiving recess being closed by an opaque cover which may be frictionally engaged along its periphery or removably slid into side grooves formed in the rear portion of the spectacles frame.

A further object of the invention is to provide spectacles of this type wherein the edges of the lamp-receiving recess are so arranged as to conceal the extremities of the lamp and its terminals, also for properly defining widthwise and heightwise the light beam emitted by said lamp, the middle plane of each recess being offset inwardly i.e. towards the nose of the spectacles' wearer with respect to the middle plane of the ocular portion of the frame for imparting convergence to the two light beams emitted by the lamps.

A still further object of the invention is to provide spectacles as aforesaid, wherein the leads through which the electric current flows toward the lamps are imbedded in the material of which the spectacles frame is made and extend adjacent its rear face so as not to show through the frame when looking at it from some distance off its front face, the lamp or each lamp being preferably provided with a small reflector extending along its rear face e.g. along the back face of the bulb, said reflector being held in position by being trapped between the lid that closes the recess rearwardly and the neighboring parts of the frame which flank the lamp-receiving recess on the front face of the frame.

With these and such other objects in view as will incidentally appear hereafter, the invention comprises the novel construction and combination of parts that will now be described with reference to the accompanying drawing.

Figure 2:
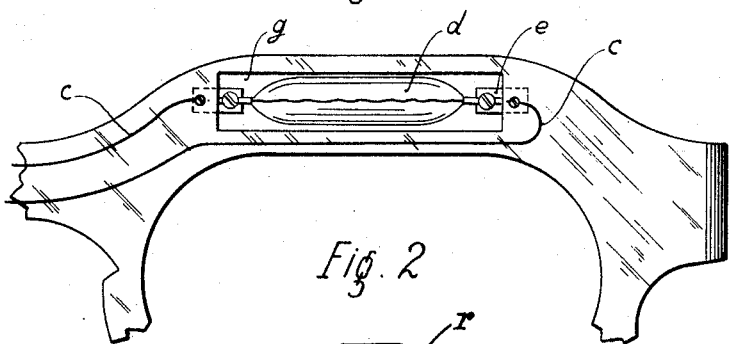
Figure 2 is a view similar to Fig. 1 but showing the part of the spectacles frame corresponding to the right eye of the wearer, said frame being seen from its rear face.

In the constructional embodiment shown in the drawing, the spectacles frame comprises in its portion overlying each of the wearer's eyes a recess $g$ (Fig. 2) in which a small electric lamp $d$ is accommodated. Said lamp is connected by suitable terminals to contacts $e$ which are held in position by small screws to which leads $c$ are connected, said leads being imbedded in the material (for example a plastic material) of which the frame is made and being connected at their remote end (not shown) to a suitable source of electric current such as a small dry or rechargeable battery which may be located for example in one of the pockets of the garment worn by the wearer.

Figure 3:
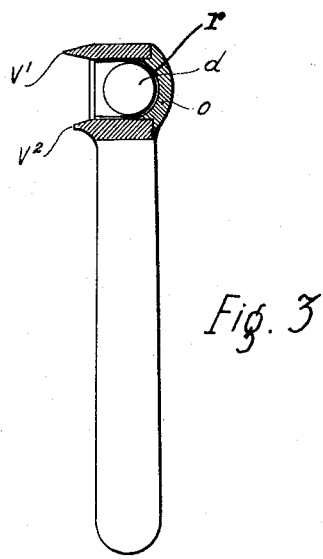
Figure 3 is a sectional view on the line III—III of Fig. 1.

The recess $g$ is constituted by a cavity open both at its front end and at its rear end and having a sufficient size at its rear end for permitting the lamp or bulb $d$ to be readily inserted into said cavity but a sufficiently restricted size at said front end for preventing said lamp $d$ from slipping out in use once it has been properly inserted and positioned between the contacts $e$. The rear end of the lamp-receiving recess or cavity $g$ is closed by a lid $o$ advantageously of curved shape as shown in Fig. 3 which may be held either by being forced into position and maintained by frictional contact or by being slid with more or less frictional resistance through side grooves (not visible in the drawing but obvious to anyone skilled in the art) formed in the adjacent material of the spectacles frame.

This arrangement ensures complete safety for the lamp $d$ since the back lid $o$ rests against the brow ridge and cannot unduly escape, while permitting the lamp $d$ to be readily replaced when necessary.

The front end or mouth $f$ of the recess or cavity $g$ is of rectangular shape in the illustrated embodiment, its length being smaller than the length of the lamp itself so that the latter canot escape and its ends and the contacts $e$ are concealed. The front mouth $f$ of the lamp-receiving cavity is provided with an upper vizor $v^1$ and a lower vizor $v^2$ which are suitably positioned and shaped for guiding the beam of light emitted by the lamp $d$. The lower vizor $v^2$ protects the wearer's eye from direct light rays emitted by the lamp $d$.

Figure 1:
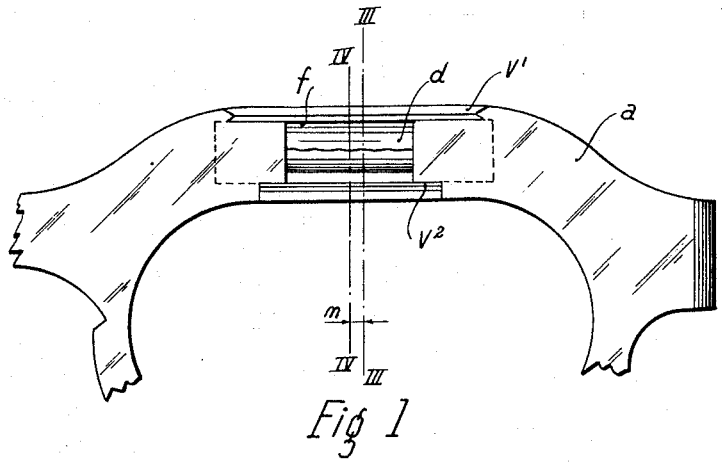
Figure 1 is a fragmentary elevational view partly broken away of the part of the spectacles frame corresponding to the left eye of the wearer, said frame being seen from its front face.

Advantageously the front end or mouth $f$ of the lamp-receiving recess or cavity $g$ has its middle transverse plane IV—IV (Fig. 1) slightly offset inwardly by a distance $m$ from the middle plane of symmetry III—III of the corresponding ocular portion. By "inwardly" is meant here that the plane IV—IV is closer to the wearer's nose than the plane III—III. Owing to this arrangement, the two beams of light emitted by the two lamps $d$ respectively adjacent the wearer's eyes are caused to converge forwardly towards the object (for instance a sheet of printed paper) being examined and illuminated by said lamps.

Advantageously also the current-carrying leads $e$ are imbedded in that portion of the material of which the spectacles frame is made which is situated rearwardly so as not to show through said frame when the frame is looked at from a position situated some distance off its front face. Obviously the leads e are connected by further leads also imbedded in one of the temples of the spectacles frame to the source of electric current as above stated.

Just behind the lamp d is arranged a reflector r of similar shape made for example of a polished metal blade which may advantageously have a U shape for encompassing the lamp d on three sides, namely on its upper side, on its back said and on its lower side. Said reflector r has substantially the same length as the recess g and is locked in position by having its end abutted against the side flanks of the opening f.

It will be seen from the foregoing that the lamps d are held in their recesses g under secure conditions, their terminals being concealed and invisible from the outside, the light beams emitted by said lamps being sharply defined by the outlines of the front openings of said recesses, while the convergence or squinting effect imparted to said light beams increases the illumination furnished by these spectacles.

Minor constructional details may be varied without departing from the scope of the subjoined claims.

What is claimed is:

1. Illuminating spectacles comprising a frame, a pair of recesses formed in the portions of said frame overlying the ocular portions, said recesses being open at their front and rear ends, an elongated electric lamp accommodated in each of said recesses, holding and connecting means for said lamps in said recesses, leads connected to said means and imbedded in the material of which the frame is made, said leads being connectable to a source of electric current, opaque lid means for removably closing the rear end of each of said recesses, the front end of each recess being shorter than the lamp so that the peripheral portion of said front end conceals said holding and connecting means, the light rays from the lamps freely passing through said front ends of the recesses.

2. Illuminating spectacles comprising a frame, a pair of recesses formed in the portions of said frame overlying the ocular portions, said recesses being open at their front and rear ends, an electric lamp accommodated in each of said recesses, holding and connecting means for said lamps in said recesses, leads connected to said holding means and imbedded in the material of which the frame is made, said leads being connectable to a source of electric current, opaque lid means removably engaged in the periphery of the rear end of each recess for closing it, the front end of each recess being smaller than the lamp so that the peripheral portion of said front end conceals said holding and connecting means, the middle vertical plane of each recess being inwardly offset with respect to the middle vertical plane of the corresponding ocular portion so as to provide overlapping of the light beams emitted from said lamps.

3. Illuminating spectacles comprising a frame, a pair of elongated recesses formed in the portions of said frame overlying the ocular portions, said recesses being open at their front and rear ends, an electric lamp accommodated in each of said recesses, holding and connecting means for said lamps in the sides of said recesses, leads connected to said holding means and imbedded in the material of the frame, said leads being connectable to a source of electric current, side grooves formed in the periphery of the rear end of each recess, an opaque lid removably engaged in said side grooves for closing the recess, the front end of each recess being smaller than the lamp for preventing it from slipping out while concealing said holding and connecting means, the middle vertical plane of each recess being inwardly offset with respect to the middle vertical plane of the corresponding ocular portion to provide overlapping of the light beams from the lamps.

4. Illuminating spectacles comprising a frame, a pair of elongated recesses formed in the portions of said frame overlying the ocular portions, said recesses being open at their front and rear ends, an electric lamp accommodated in each of said recesses, holding and connecting means for said lamps in the sides of said recesses, leads connected to said holding means and imbedded in the material of the inward portion of the frame, said leads being connectable to a source of electric current, an opaque lid removably held by the periphery of the rear end of said recess for closing it, a reflector interposed between said lid and said lamp in each recess, the front end of each recess being smaller than the lamp for preventing it from slipping out while concealing said holding and connecting means, the middle plane of each recess being offset inwardly toward the wearer's nose with respect to the middle vertical plane of the corresponding ocular portion to provide overlapping of the light beams emitted by said lamps.

5. Illuminating spectacles comprising a frame having temples, a pair of elongated recesses formed in the portions of said frame overlying the ocular portions, said recesses being open at their front and rear ends, an electric lamp accommodated in each of said recesses, the rear ends of the recesses being of such a size as readily to allow of insertion of the lamp, holding and connecting means for the lamps in the sides of said recesses, leads connected to said holding means and imbedded in the material of the inward portion of the frame and in at least one of its temples, said leads being connectable to a source of electric current, an opaque lid of inwardly curved outline removably held by the periphery of the rear end of said recess for closing it, a U-shaped reflector interposed between said lid and said lamp in each recess, the sides of the reflector being held and concealed under the frame material at the opposite ends of said recess, the front end of each recess being shorter than the lamp for holding the same securely in the recess while concealing said holding and connecting means, the middle vertical plane of each recess being offset inwardly toward the wearer's nose with respect to the middle vertical plane of the corresponding ocular portion to provide overlapping of the light beams emitted by said lamps, each recess being bordered by upper and lower vizors.

References Cited in the file of this patent

FOREIGN PATENTS

| 235,202 | Great Britain | Feb. 4, 1926 |
| 361,177 | Great Britain | Nov. 19, 1931 |
| 748,733 | France | Apr. 25, 1933 |
| 500,398 | Belgium | Jan. 31, 1951 |